(12) United States Patent
Jung et al.

(10) Patent No.: US 12,255,303 B2
(45) Date of Patent: Mar. 18, 2025

(54) BATTERY RACK AND POWER STORAGE DEVICE COMPRISING SAME

(71) Applicant: LG ENERGY SOLUTION, LTD., Seoul (KR)

(72) Inventors: Goan-Su Jung, Daejeon (KR); Seung-Jun Lee, Daejeon (KR); Kown Son, Daejeon (KR); Jong-Soo Lee, Daejeon (KR); Jin-Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 633 days.

(21) Appl. No.: 17/624,951

(22) PCT Filed: Nov. 6, 2020

(86) PCT No.: PCT/KR2020/015552
§ 371 (c)(1),
(2) Date: Jan. 5, 2022

(87) PCT Pub. No.: WO2021/091328
PCT Pub. Date: May 14, 2021

(65) Prior Publication Data
US 2022/0285760 A1    Sep. 8, 2022

(30) Foreign Application Priority Data
Nov. 8, 2019   (KR) .................. 10-2019-0142927

(51) Int. Cl.
*H01M 10/6567*   (2014.01)
*H01M 50/209*    (2021.01)

(52) U.S. Cl.
CPC ..... *H01M 10/6567* (2015.04); *H01M 50/209* (2021.01)

(58) Field of Classification Search
None
See application file for complete search history.

(56) References Cited

U.S. PATENT DOCUMENTS

2016/0059056 A1    3/2016   Hoffman, III

FOREIGN PATENT DOCUMENTS

| CN | 109686888 A | 4/2019 |
|----|-------------|--------|
| CN | 109893802 A | 6/2019 |
| CN | 109999386 A | 7/2019 |
| CN | 110061162 A | 7/2019 |
| CN | 110120477 A | 8/2019 |

(Continued)

OTHER PUBLICATIONS

Machine translation of JP 2018063765 (Year: 2018).*

(Continued)

*Primary Examiner* — Wyatt P McConnell
(74) *Attorney, Agent, or Firm* — Birch, Stewart, Kolasch & Birch, LLP

(57) ABSTRACT

A battery pack includes a plurality of battery modules respectively having at least one battery cell, a rack case configured to accommodate the plurality of battery modules, a fire distinguishing water supply unit disposed at the rear of the rack case and connected to the plurality of battery modules, and a bracket unit configured to cover the fire distinguishing water supply unit and disposed at the rear of the rack case.

10 Claims, 12 Drawing Sheets

(56) References Cited

FOREIGN PATENT DOCUMENTS

| | | |
|---|---|---|
| CN | 110270032 A | 9/2019 |
| JP | 11-219732 A | 8/1999 |
| JP | 2012-252909 A | 12/2012 |
| JP | 2013-251127 A | 12/2013 |
| JP | 2015-069845 A | 4/2015 |
| JP | 2017-525510 A | 9/2017 |
| JP | 2018-63765 A | 4/2018 |
| JP | 2019-029245 A | 2/2019 |
| JP | 2019-75191 A | 5/2019 |
| KR | 10-2016-0037542 A | 4/2016 |
| KR | 10-1706717 B1 | 3/2017 |
| KR | 10-1939812 B1 | 1/2019 |
| KR | 10-2021072 B1 | 11/2019 |

OTHER PUBLICATIONS

Extended European Search Report for corresponding European Application No. 20885468.7, dated Mar. 13, 2023.
International Search Report (PCT/ISA/210) issued in PCT/KR2020/015552, dated Feb. 23, 2021.

* cited by examiner

BATTERY RACK AND POWER STORAGE DEVICE COMPRISING SAME

TECHNICAL FIELD

The present disclosure relates to a battery rack and an energy storage system including the battery rack.

The present application claims priority to Korean Patent Application No. 10-2019-0142927 filed on Nov. 8, 2019 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery rack by using at least one battery module and adding other components. Here, according to various voltage and capacity requirements, an energy storage system may be configured to include at least one battery rack that includes at least one battery module.

In the conventional battery rack, if an abnormal heating occurs in the battery cells of at least one battery module so that the temperature continuously rises, a thermal runaway is generated over a certain temperature and propagates to surrounding battery modules, which may a serious safety problem.

Therefore, there is a need to find a technique for providing a battery rack capable of quickly preventing heat propagation to peripheral battery modules due to thermal runaway, and an energy storage system including such a battery rack.

DISCLOSURE

Technical Problem

The present disclosure is directed to providing a battery rack, which may quickly prevent heat propagation to peripheral battery modules due to thermal runaway, and an energy storage system including such a battery rack.

In addition, the present disclosure is also directed to providing a battery rack, which may secure overall rigidity and protect a nozzle or the like from external impacts by means of a double bracket structure, and an energy storage system including such a battery rack.

Technical Solution

In one aspect of the present disclosure, there is provided a battery rack, comprising: a plurality of battery modules each battery module of the plurality of battery modules having at least one battery cell; a rack case configured to accommodate the plurality of battery modules; a fire extinguishing water supplier disposed at a rear of the rack case and connected to the plurality of battery modules; and a bracket configured to cover the fire extinguishing water supplier and disposed at the rear of the rack case.

The fire extinguishing water supplier may include a fire extinguishing water pipe disposed along a height direction of the rack case; and a plurality of fire extinguishing_water nozzles connected to the fire extinguishing water pipe and mounted through the plurality of battery modules.

The bracket unit may include a first bracket configured to cover the fire extinguishing water pipe; and a second bracket fixed to the first bracket and configured to support the plurality of fire extinguishing water nozzles.

The first bracket may have a plurality of venting holes disposed opposite to the plurality of fire extinguishing water nozzles.

Each of the plurality of fire extinguishing water nozzles may include a nozzle body mounted through the second bracket; and a nozzle head connected to the nozzle body and configured to penetrate one of the plurality of battery modules.

Each of the plurality of fire extinguishing water nozzles may further include a sealing member provided at an outer side of the nozzle body.

The sealing member may be disposed in contact with the second bracket.

The plurality of venting holes may be disposed at a side opposite to the fire extinguishing water nozzle.

The plurality of venting holes may be disposed to be spaced apart from each other along a height direction of the first bracket.

In addition, the present disclosure also provides an energy storage system, comprising at least one battery rack according to the above embodiments.

Advantageous Effects

According to various embodiments as above, it is possible to provide a battery rack, which may quickly prevent heat propagation to peripheral battery modules due to thermal runaway, and an energy storage system including such a battery rack.

In addition, according to various embodiments as above, it is possible to provide a battery rack, which may secure overall rigidity and protect a nozzle or the like from external impacts by means of a double bracket structure, and an energy storage system including such a battery rack.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
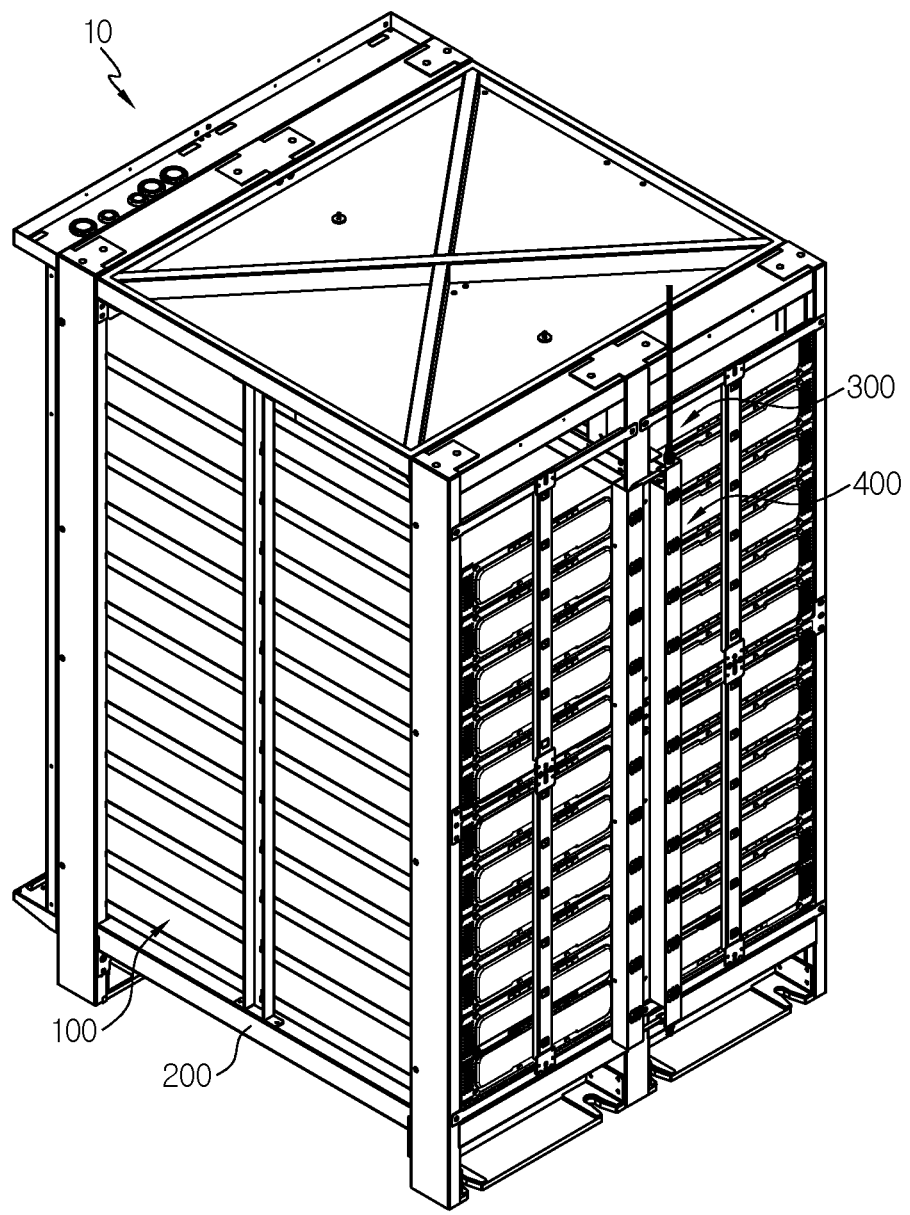
FIG. 1 is a diagram for illustrating a battery rack according to an embodiment of the present disclosure.
Figure 2:
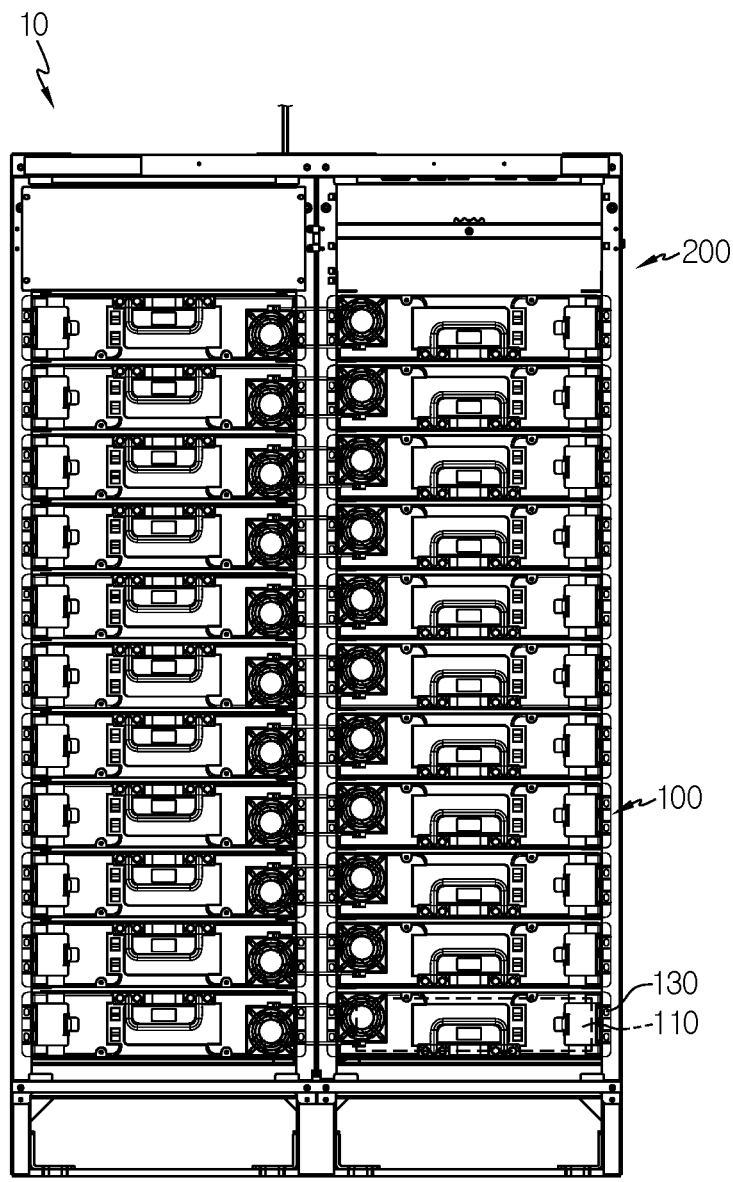
FIG. 2 is a front view showing the battery rack of FIG. 1.
Figure 3:
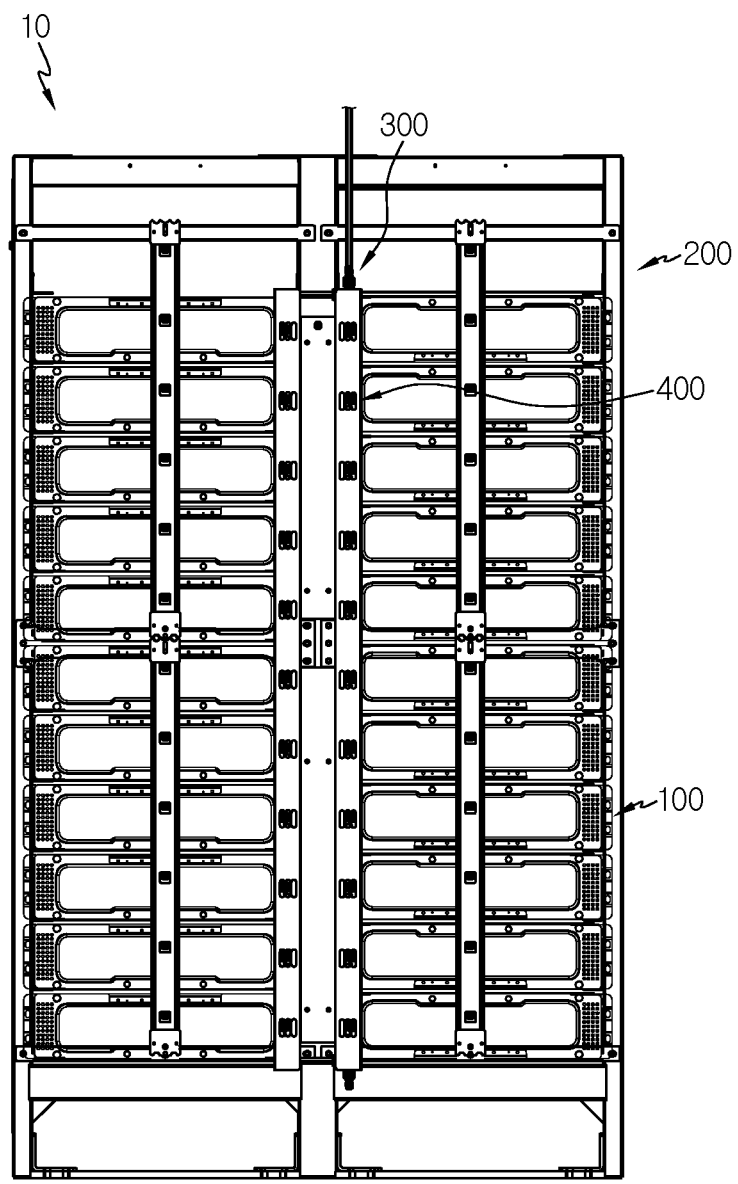
FIG. 3 is a rear view showing the battery rack of FIG. 1.
Figure 4:
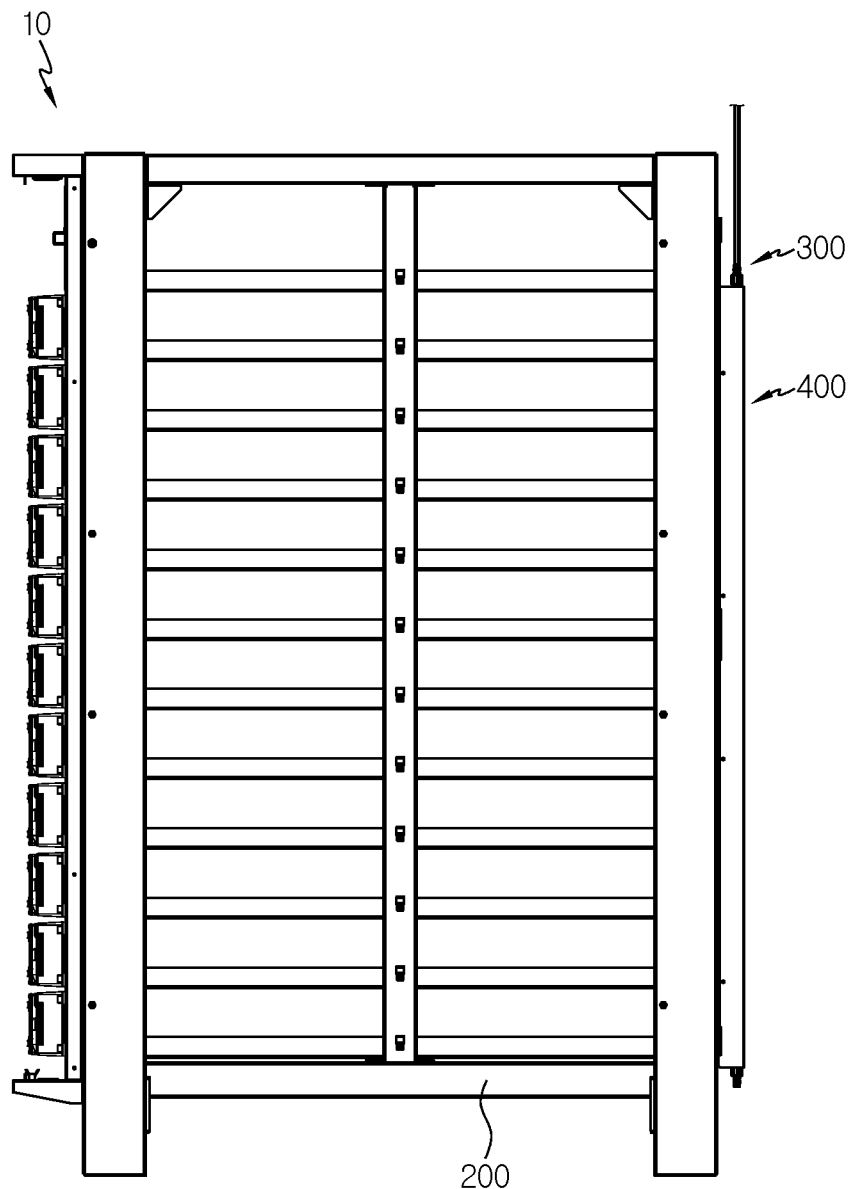
FIG. 4 is a side view showing the battery rack of FIG. 1.

FIG. 1 is a diagram for illustrating a battery rack according to an embodiment of the present disclosure, FIG. 2 is a front view showing the battery rack of FIG. 1, FIG. 3 is a rear view showing the battery rack of FIG. 1, and FIG. 4 is a side view showing the battery rack of FIG. 1.

Referring to FIGS. 1 to 4, a battery rack 10 may include a battery module 100, a rack case 200, a fire distinguishing water supply unit 300, and a bracket unit 400.

The battery module 100 may be provided in plural. The plurality of battery modules 100 may be stacked on each other so as to be electrically connected to each other. For example, the plurality of battery modules 100 may be arranged in two rows along a height direction of the battery rack 200, explained later.

Each of the plurality of battery modules 100 may include a battery cell 110 and a module case 130, respectively.

The battery cell 110 is a secondary battery and may be provided as a pouch-type secondary battery, a rectangular secondary battery or a cylindrical secondary battery. Hereinafter, in this embodiment, it will be described that the battery cell 110 is a pouch-type secondary battery.

One battery cell 110 or a plurality of battery cells 110 may be provided. Hereinafter, in this embodiment, it will be described that a plurality of battery cells 110 are provided.

The module case 130 may accommodate the plurality of battery cells 110 therein. For this, the module case 130 may have an accommodation space capable of accommodating the plurality of battery cells 110.

Figure 11:
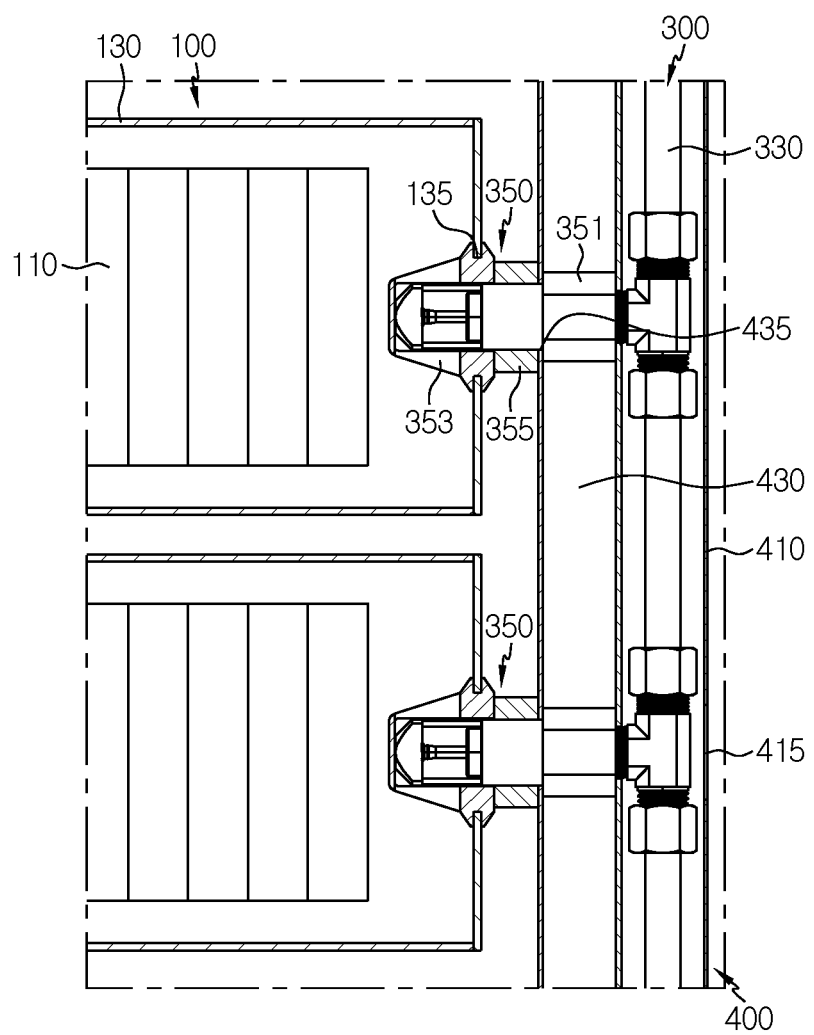
FIG. 11 is a diagram for illustrating a structure in which the fire distinguishing water supply unit mounted to the bracket unit of the battery rack of FIG. 1 is mounted to a battery module.

The module case 130 may have a nozzle insert portion 135 (see FIG. 11). The nozzle insert portion 135 is provided at a rear surface of the module case 130, and a nozzle head 353 (see FIG. 11) of a fire distinguishing water nozzle 350 (see FIG. 11) of the fire distinguishing water supply unit 300, explained later, may be mounted to the nozzle insert portion 135.

The rack case 200 may accommodate the plurality of battery modules 100. To this end, the rack case 200 may have an accommodation space capable of accommodating the plurality of battery modules 100.

The fire distinguishing water supply unit 300 is disposed at the rear of the rack case 200 and may be connected to the plurality of battery modules 100. The fire distinguishing water supply unit 300 may supply a fire distinguishing water into the plurality of battery modules 100 when an abnormal situation such as a thermal runaway of the plurality of battery modules 100 occurs.

To this end, the fire distinguishing water supply unit 300 may be mounted through the module cases 200 of the plurality of battery modules 100 to directly inject the fire distinguishing water to the battery cells 110 inside the module case 200 in the event of the abnormal situation.

In this embodiment, by means of the fire distinguishing water supply unit 300, which may directly inject the fire distinguishing water toward the battery cells 110 inside the module case 200, when a thermal runaway or fire occurs inside the battery module 100, it is possible to extinguish the thermal runaway or fire more quickly.

The fire distinguishing water supply unit 300 may be connected to a fire distinguishing water tank unit 90 (see FIG. 12) through a fire distinguishing water supply line 70 (see FIG. 12), explained later, provided at the outside of the battery rack 10 to supply the fire distinguishing water.

Hereinafter, the fire distinguishing water supply unit 300 according to this embodiment will be described in more detail.

Figure 5:
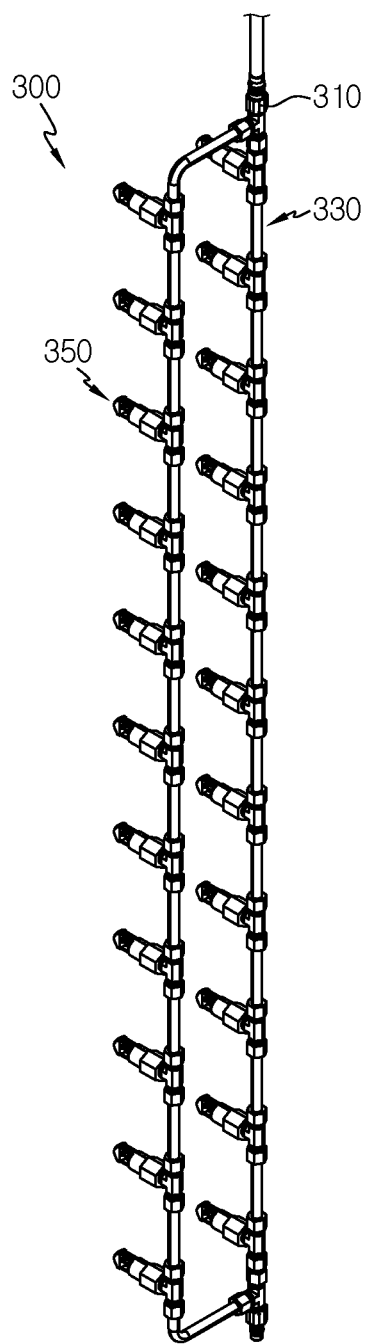
FIG. 5 is a diagram for illustrating a fire distinguishing water supply unit, employed at the battery rack of FIG. 1.
Figure 6:
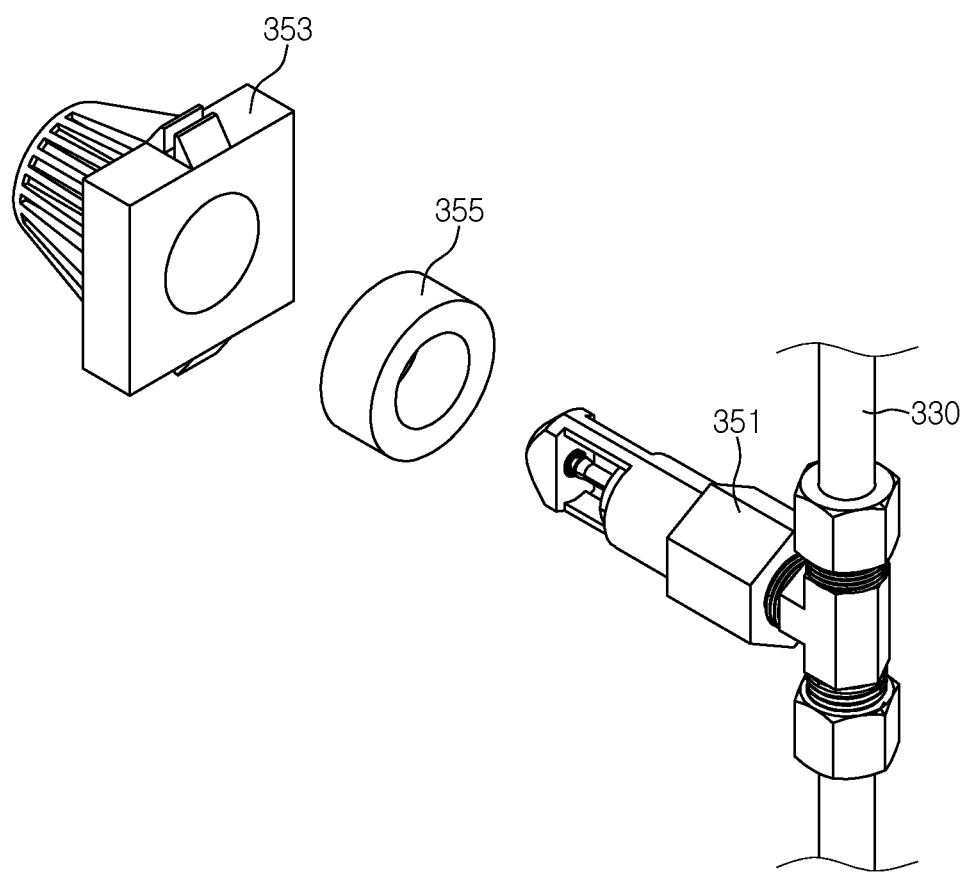
FIG. 6 is a diagram for illustrating a fire distinguishing water nozzle of the fire distinguishing water supply unit of FIG. 5.

FIG. 5 is a diagram for illustrating a fire distinguishing water supply unit, employed at the battery rack of FIG. 1, and FIG. 6 is a diagram for illustrating a fire distinguishing water nozzle of the fire distinguishing water supply unit of FIG. 5.

Referring to FIGS. 5 and 6, the fire distinguishing water supply unit 300 may include a supply pipe 310, a fire distinguishing water pipe 330, and a fire distinguishing water nozzle 350.

The supply pipe 310 may be connected to the fire distinguishing water tank unit 90 (see FIG. 12) through the fire distinguishing water supply line 70 (see FIG. 12), explained later. The supply pipe 310 may be supplied with the fire distinguishing water from the fire distinguishing water tank unit 90 through the fire distinguishing water supply line 70.

The fire distinguishing water pipe 330 is connected to the supply pipe 310 and may be arranged along a height direction of the rack case 200. For example, the supply pipe 310 may be arranged in two rows along the height direction of the rack case 200 and provided in an approximately rectangular frame shape.

The fire distinguishing water nozzle 350 is connected to the fire distinguishing water pipe 330 and may be mounted through the plurality of battery modules 200. Accordingly, the fire distinguishing water nozzle 350 may be provided in plural to correspond to the plurality of battery modules 200.

The plurality of fire distinguishing water nozzles 350 may include a nozzle body 351, a nozzle head 353, and a sealing member 355.

The nozzle body 351 may be mounted through the second bracket 430 of the bracket unit 400, explained later. The nozzle body 351 may be mounted through the bracket unit 400, explained later. The nozzle body 351 is connected to the fire distinguishing water pipe 330 and may be at least partially disposed inside the plurality of battery modules 100. Specifically, the nozzle body 353 may, at least partially, be disposed between the second bracket 430 and the rear surface of the rack case 200.

The nozzle body 351 may have a passive valve or an active valve. The passive valve or active valve may keep an inner channel of the nozzle body 351 to be closed under normal circumstances. Also, in an abnormal situation such as thermal runaway of the battery module 100, the passive valve or active valve may operate to open the inner channel so that the fire distinguishing water may be sprayed toward the battery module 100 where the abnormal situation occurs.

One end of the nozzle body 351 may be disposed inside the module case 130 of the battery module 100. Accordingly, when an abnormal situation such as thermal runaway occurs at the battery module 100, the nozzle body 353 may spray the fire distinguishing water into the module case 130, thereby more quickly cooling the battery cells 110 of the battery module 100 where the abnormal situation occurs.

The nozzle head 353 is connected to the nozzle body 351 and may be mounted through the plurality of battery modules 200. Specifically, the nozzle head 353 may be mounted to the nozzle insert portion 135 of the module case 130 to penetrate the module case 130 of the battery module 200.

The sealing member 355 may be provided to an outer side of the nozzle body 351. The sealing member 355 may be disposed in close contact with the second bracket 430 of the bracket unit 400, explained later.

The sealing member 355 may be disposed in contact with the second bracket 430 while surrounding the outer side of the nozzle body 351. Through this, the sealing member 355 may more reliably prevent the fire distinguishing water or the like from leaking to the outside of the nozzle body 351. Specifically, when an abnormal situation occurs in any one battery module 100 among the plurality of battery modules 100, the fire distinguishing water may be sprayed from the nozzle body 351 of the fire distinguishing water nozzle 350 connected to the battery module 100 where the abnormal situation occurs. When the fire distinguishing water is sprayed, it may be necessary to prevent the fire distinguishing water from flowing into the battery module 100 where the abnormal situation has not occurred even though the fire distinguishing water is leaked to the outside of the nozzle body 351. In this embodiment, since the sealing member 355 is disposed in close contact with the second bracket 430 of the bracket unit 400 at the outer side of the nozzle body 351, it is possible to more reliably and firmly prevent the fire distinguishing water from leaking out of the nozzle body 351 where the fire distinguishing water is sprayed.

The bracket unit 400 covers the fire distinguishing water supply unit 300 and may be disposed at the rear of the rack case 200.

Hereinafter, the bracket unit 400 will be described in more detail with reference to the following drawings.

Figure 7:
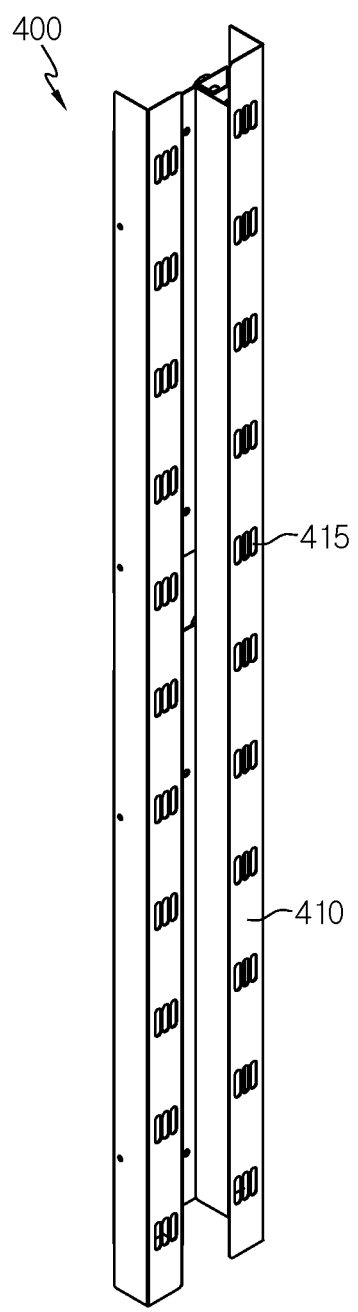
FIGS. 7 and 8 are diagrams for illustrating a bracket unit, employed at the battery rack of FIG. 1.
Figure 8:
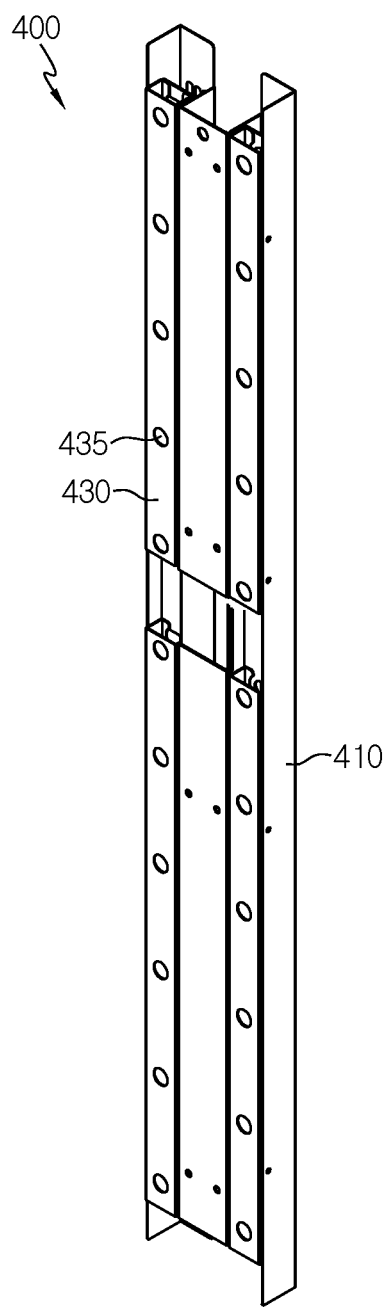
Figure 9:
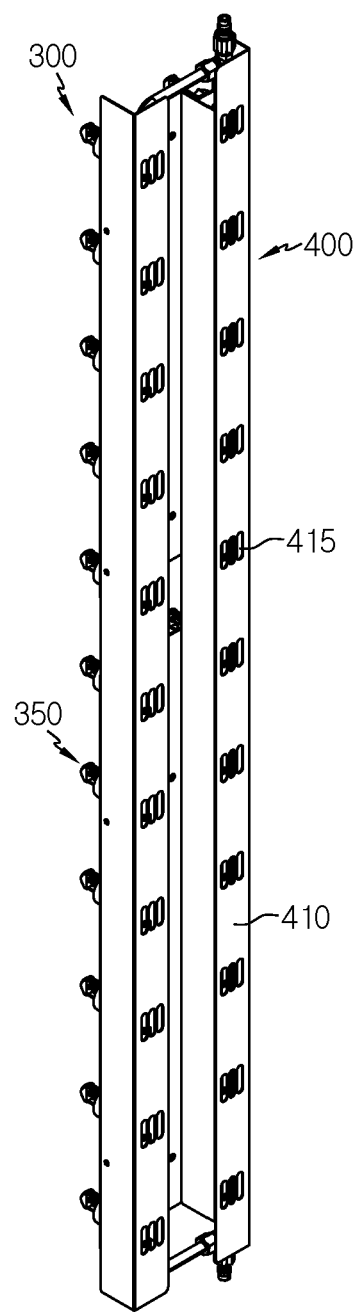
FIGS. 9 and 10 are diagrams for illustrating the fire distinguishing water supply unit mounted to the bracket unit of the battery rack of FIG. 1.
Figure 10:
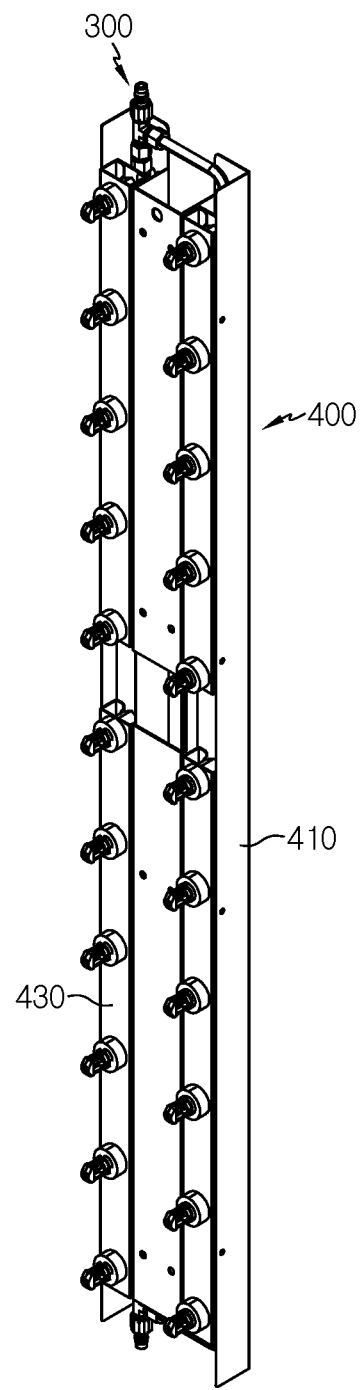

FIGS. 7 and 8 are diagrams for illustrating a bracket unit, employed at the battery rack of FIG. 1, FIGS. 9 and 10 are diagrams for illustrating the fire distinguishing water supply unit mounted to the bracket unit of the battery rack of FIG. 1, and FIG. 11 is a diagram for illustrating a structure in which the fire distinguishing water supply unit mounted to the bracket unit of the battery rack of FIG. 1 is mounted to a battery module.

Referring to FIGS. 7 to 11, the bracket unit 400 may include a first bracket 410 and a second bracket 430.

The first bracket 410 may cover the fire distinguishing water pipe 330 of the fire distinguishing water supply unit 300. The first bracket 410 may be disposed to surround the fire distinguishing water pipe 330. By means of the first bracket 410, it is possible to prevent a direct shock such as an external shock from being transmitted to the fire distinguishing water pipe 330, and it is also possible to effectively buffer an external shock or the like that may be transmitted to the fire distinguishing water pipe 330. Accordingly, in this embodiment, by means of the first bracket 410, it is possible to effectively prevent the fire distinguishing water pipe 330 from being damaged.

The first bracket 410 may have a venting hole 415.

The venting hole 415 may be provided in plural.

The plurality of venting holes 415 may be provided in a number corresponding to the plurality of fire distinguishing water nozzles 350. The plurality of venting holes 415 may be disposed to be spaced apart from each other by a predetermined distance along a height direction of the first bracket 410 and may be disposed in two rows along the height direction.

The plurality of venting holes 415 may be disposed opposite to the plurality of fire distinguishing water nozzles 350. The plurality of venting holes 415 may be disposed at a side opposite to the fire distinguishing water nozzles 350.

The plurality of venting holes 415 as above may guide discharge of gas that is generated when an abnormal situation such as thermal runaway or fire occurs at the battery modules 100. Accordingly, in this embodiment, through the plurality of venting holes 415, the high-temperature gas that may be generated when an abnormal situation occurs may be discharged more quickly to the outside of the battery rack 10, specifically to the rear of the battery rack 10.

The second bracket 430 is fixed to the first bracket 410 and may support the plurality of fire distinguishing water nozzles 350. In this embodiment, by means of the second bracket 430, the fire distinguishing water nozzle 350 of the fire distinguishing water supply unit 300 may be supported more stably.

Moreover, the second bracket 430 may cover the front side of the fire distinguishing water pipe 330 by forming a double bracket structure together with the first bracket 410, thereby more reliably protecting the fire distinguishing water pipe 330 and also increasing the overall rigidity of the bracket unit 400.

The second bracket 430 may include a nozzle mounting portion 435 through which the fire distinguishing water nozzle 350 is mounted.

The nozzle mounting portion 435 may be provided in plural to correspond to a number of the fire distinguishing water nozzles 350. The plurality of nozzle mounting portions 435 may be disposed to be spaced from each other by a predetermined distance along the height direction of the second bracket 430 and may be disposed in two rows along the height direction.

As described above, by means of the bracket unit 400, the battery rack 10 according to this embodiment may support the fire distinguishing water pipe 330 of the fire distinguishing water supply unit 300 and guide the fire distinguishing water nozzle 350 to be more stably supported and mounted.

In addition, since the battery rack 10 according to this embodiment forms a double bracket structure by means of the bracket unit 400, it is possible to protect and buffer the fire distinguishing water supply unit 300 against external shocks to the maximum and also further enhance the overall rigidity.

Figure 12:
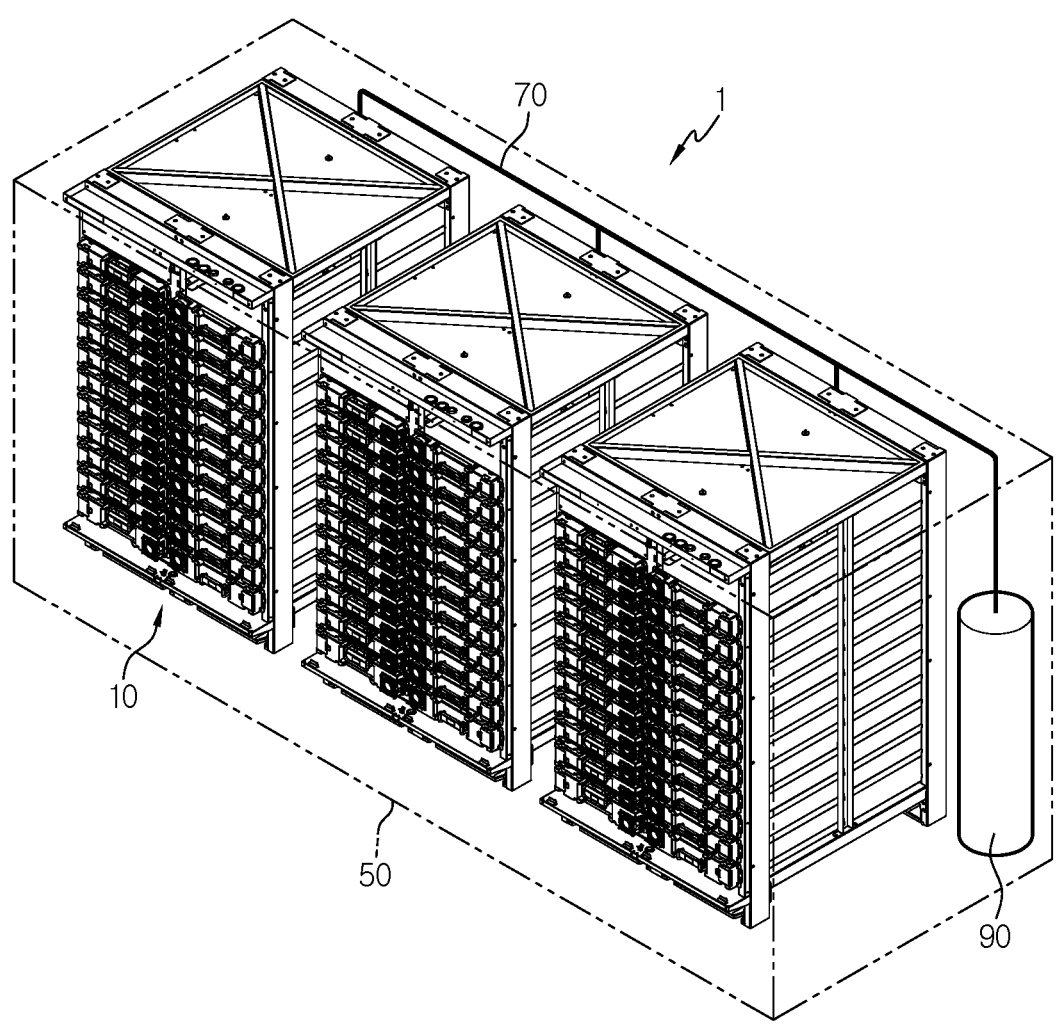
FIG. 12 is a diagram for illustrating an energy storage system according to an embodiment of the present disclosure.

FIG. 12 is a diagram for illustrating an energy storage system according to an embodiment of the present disclosure.

Referring to FIG. 12, an energy storage system 1 is an energy source and may be used for home or industrial use. The energy storage system 1 may include at least one battery rack 10 of the former embodiment, and a rack container 50 for accommodating the at least one battery rack 10.

The rack container 50 may include a fire extinguishing tank unit 90 for supplying a fire distinguishing water to the plurality of battery racks 10. The fire distinguishing water tank unit 90 is filled with the fire distinguishing water, namely water. The fire distinguishing water tank unit 90 is connected through the plurality of battery rack 10 through the fire extinguishing water supply line 70 to supply the fire distinguishing water toward the plurality of battery rack 10.

Since the energy storage system 1 according to this embodiment includes the battery rack 10 of the former embodiment, it is possible to provide an energy storage system 1 that includes all the advantages of the battery rack 10 of the former embodiment.

According to various embodiments as above, it is possible to provide a battery rack 10, which may quickly prevent heat propagation to peripheral battery modules 100 due to thermal runaway, and an energy storage system 1 including such a battery rack 10.

In addition, according to various embodiments as above, it is possible to provide a battery rack 10, which may secure overall rigidity and protect a nozzle or the like from external impacts by means of a double bracket structure, and an energy storage system 1 including such a battery rack 10.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery rack, comprising:
    a plurality of battery modules, each battery module of the plurality of battery modules having at least one battery cell;
    a rack case configured to accommodate the plurality of battery modules;
    a fire extinguishing water supplier disposed at a rear of the rack case and connected to the plurality of battery modules; and
    a bracket configured to cover the fire extinguishing water supplier and disposed at the rear of the rack case, wherein the fire extinguishing water supplier is between the rear of the rack case and a rear wall of the bracket.

2. The battery rack according to claim 1, wherein the fire extinguishing water supplier includes:
    a fire extinguishing water pipe disposed along a height direction of the rack case; and
    a plurality of fire extinguishing water nozzles connected to the fire extinguishing water pipe and mounted through the plurality of battery modules.

3. The battery rack according to claim 2, wherein the bracket includes:
    a first bracket configured to cover the fire extinguishing water pipe; and
    a second bracket fixed to the first bracket and configured to support the plurality of fire extinguishing water nozzles.

4. The battery rack according to claim 3, wherein the first bracket has a plurality of venting holes disposed opposite to the plurality of fire extinguishing water nozzles.

5. The battery rack according to claim 3, wherein each of the plurality of fire extinguishing water nozzles includes:
    a nozzle body mounted through the second bracket; and
    a nozzle head connected to the nozzle body and configured to penetrate one of the plurality of battery modules.

6. The battery rack according to claim 5, wherein each of the plurality of fire extinguishing water nozzles further includes a sealing member provided at an outer side of the nozzle body.

7. The battery rack according to claim 6, wherein the sealing member is disposed in contact with the second bracket.

8. The battery rack according to claim 4, wherein the plurality of venting holes are disposed at a side opposite to the fire extinguishing water nozzle.

9. The battery rack according to claim 4, wherein the plurality of venting holes are disposed to be spaced apart from each other along a height direction of the first bracket.

10. An energy storage system, comprising at least one battery rack as defined in claim 1.

* * * * *